US007242565B2

(12) United States Patent
Yoshio

(10) Patent No.: US 7,242,565 B2
(45) Date of Patent: Jul. 10, 2007

(54) THERMAL SHUT-DOWN CIRCUIT

(75) Inventor: Katsura Yoshio, Osaka (JP)

(73) Assignee: Texas Instruments Incorporated, Dallas, TX (US)

( * ) Notice: Subject to any disclaimer, the term of this patent is extended or adjusted under 35 U.S.C. 154(b) by 262 days.

(21) Appl. No.: 10/990,916

(22) Filed: Nov. 16, 2004

(65) Prior Publication Data

US 2006/0104001 A1      May 18, 2006

(30) Foreign Application Priority Data

Nov. 21, 2003   (JP) ............... 2003-392933

(51) Int. Cl.
*H02H 5/04*     (2006.01)
(52) U.S. Cl. ..................................... 361/103
(58) Field of Classification Search ................. 361/103
See application file for complete search history.

(56) References Cited

U.S. PATENT DOCUMENTS 5,391,980 A * 2/1995 Thiel et al. ................. 323/314
5,737,170 A * 4/1998 Moyer ......................... 361/103
5,942,888 A * 8/1999 Tan ............................. 323/315
7,091,713 B2 * 8/2006 Erdelyi et al. ............... 323/314
2004/0066180 A1* 4/2004 Harrison ....................... 323/312
2005/0242799 A1* 11/2005 Erdelyi et al. ............... 323/312

OTHER PUBLICATIONS

Jam Miler et al. Nonlinear Analysis of Noise in Static and Dinamic Translinear Circuits IEEE Transactions on Circuits and Systems-II: Analog and Digital Signal Processing, vol. 46, No. 3, Mar. 1999.*
Wolfgang Horn and Heinz Zitta A Robast Power Bandgap Reference Circuit fir Use in an Automotive Enviornment. IEEE Journal of Solid-State Circuits, vol. 37, No. 7, Jul. 2002.*

* cited by examiner

*Primary Examiner*—Stephen W. Jackson
*Assistant Examiner*—Boris Benenson
(74) *Attorney, Agent, or Firm*—William B Kempler; W. James Brady, III; Frederick J. Telecky, Jr.

(57) ABSTRACT

A primary current circuit 42 that outputs a primary current IPTAT proportional to the primary coefficient of temperature, secondary current circuit 43 outputs a secondary current IPTAT2 proportional to the Nth (N: an integer of 2 or larger) coefficient of temperature based on the primary current, constant current source 41 that supplies current to the primary and secondary currents, and power control switch Q11 that shuts down the voltage supply based on a rise in the secondary current.

13 Claims, 4 Drawing Sheets

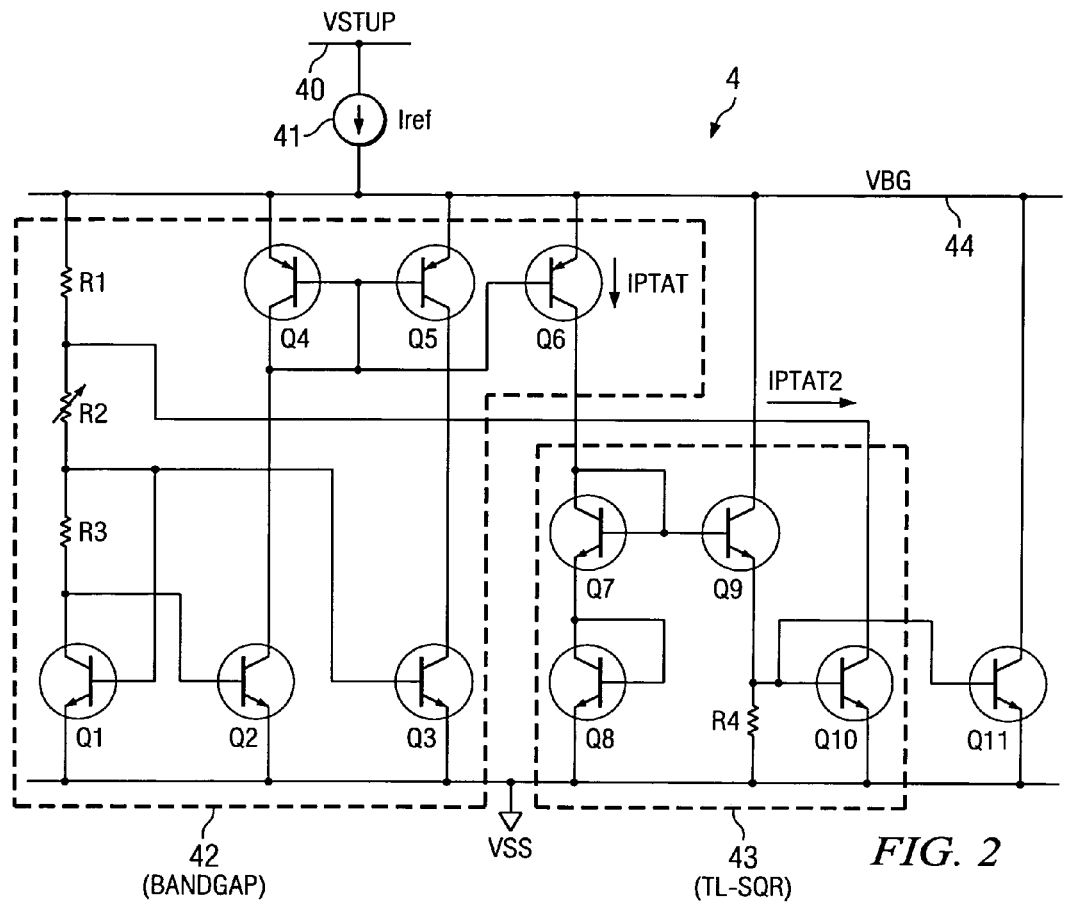
FIG. 2
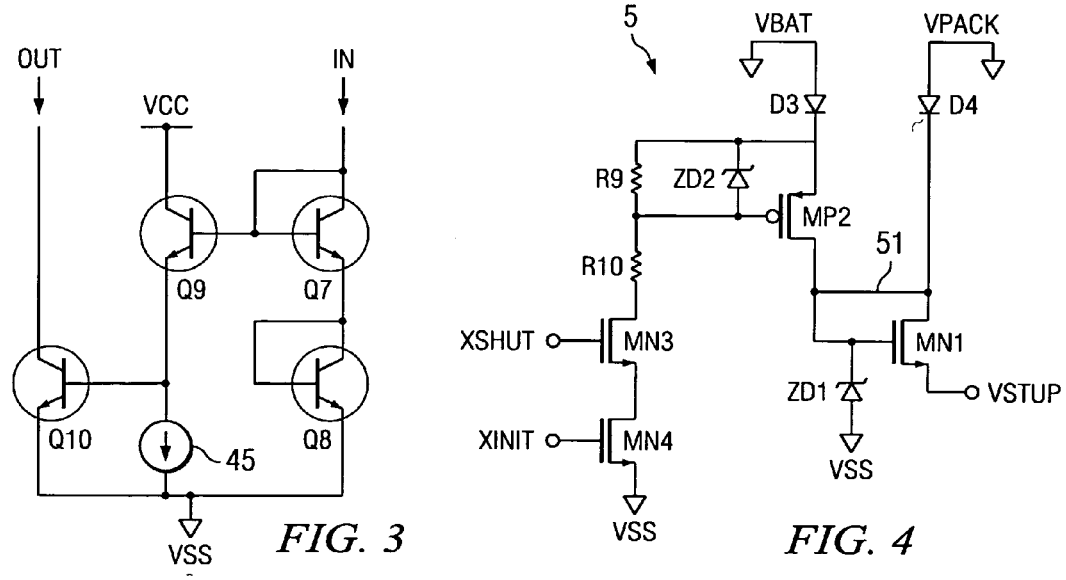
FIG. 3
FIG. 4

THERMAL SHUT-DOWN CIRCUIT

FIELD OF THE INVENTION

The present invention pertains to a thermal shut-down circuit that shuts down power to a powered circuit when the temperature rises.

BACKGROUND OF THE INVENTION

FIG. 8 shows a typical configuration of a thermal shut-down circuit.

Thermal shut-down circuit 100 is connected to a specific circuit 200 and can stop the operation of circuit 200 when the temperature rises. Said circuit 200 shown in the figure is driven by a bias current supplied from constant current source 201 when a power supply voltage VDD is supplied to constant current source 201.

Thermal shut-down circuit 100 comprises constant current source 101 and Zener diode ZD connected in series between power supply voltage VDD and reference potential VSS, resistors R100 and R101 connected in series between the cathode of Zener diode ZD and reference potential VSS, and NPN transistor Q100 used as a power control switch with its base connected to the node between resistors R100 and R101, its collector connected to the power end of circuit 200, and its emitter held at reference potential VSS.

When power supply voltage VDD is supplied, a reference current is supplied from constant current source 101 and flows toward resistors R100 and R101. At this time, since the cathode of Zener diode ZD is kept at a constant reference voltage VREF, the base bias voltage of NPN transistor Q100 is determined by the constant voltage at the node between resistors R100 and R101.

Since the base-emitter voltage Vbe of NPN transistor Q100 has a temperature characteristic of about −2 mV/° C., the base bias voltage of NPN transistor Q100 increases along with a rise in temperature. When a prescribed temperature is reached, NPN transistor Q100 is turned on. When NPN transistor Q100 is on, the potential at the power end of circuit 200 is pulled back to reference potential VSS, and thus the current supplied to circuit 200 is shut down. Circuit 200 is protected or its output is stopped by this thermal shut-down operation.

Said thermal shut-down circuit 100 has the following problems.

First of all, the detected temperature varies significantly depending on the temperature characteristic of Zener diode ZD at the reference voltage.

Second of all, the detected temperature varies significantly depending on changes in the characteristics of NPN transistor Q100 and the variation occurring during manufacturing.

Third of all, since NPN transistor Q100 gradually enters into the on state from the off state as the temperature rises, a sharp thermal shut-down characteristic cannot be obtained.

Since said thermal shut-down circuit 100 might operate at a temperature out of the range of reliable circuit operation when the aforementioned problems occur at the same time, it is difficult to guarantee a temperature range for reliable operation. Also, the wide range of detection temperatures of thermal shut-down circuit 100 is a serious problem.

SUMMARY OF THE INVENTION

A general object of the present invention is to provide a thermal shut-down circuit that can change the response point of thermal shut-down depending on the characteristics of the constituent elements of the thermal shut-down circuit or the variation of these circuit elements and can realize a sharp thermal shut-down characteristic with respect to the temperature change.

This and other objects and features are provided, in accordance with one aspect of the present invention by a thermal shut-down circuit used to shut down power to a powered circuit when the temperature rises. One aspect has the following features: a first current circuit, which outputs a first current mainly dependent on the primary coefficient of temperature; a second current circuit, which receives the aforementioned first current as input and outputs a second current mainly dependent on the Nth (N: an integer of 2 or larger) coefficient of temperature; a constant current sources that supplies current to the aforementioned first and second current circuits; and a power control circuit, which responds to an increase in the aforementioned second current and is used to cutoff power to the powered circuit.

Preferably, in an aspect of the thermal shut-down circuit, the aforementioned power control circuit is connected to the node between the aforementioned constant current source and the first current circuit as well as the second current circuit, and power is supplied to the powered circuit from node.

Also, preferably, in an aspect of the aforementioned first current circuit has a band gap circuit used for supplying a band gap voltage to the aforementioned node. The aforementioned power control circuit comprises a transistor element. When the aforementioned transistor element introduces a current larger than the current supplied by the aforementioned constant current source from the aforementioned connection middle point, the voltage at the aforementioned node, and power to the aforementioned fed circuit is shut down.

Also, preferably, in an aspect of the aforementioned second current circuit has a trans-linear circuit that supplies the aforementioned second current without being affected by the variation in the parameters of the circuit elements that constitute the second current circuit.

In addition, in an aspect of the present invention, the first current circuit has a first current mirror circuit for supplying a first mirror current and a second current mirror circuit for supplying a second mirror current corresponding to the first mirror current. The control terminal of the aforementioned transistor element is connected to the control terminal of the transistor in the second current circuit that supplies the aforementioned second current.

One aspect of the thermal shut-down circuit with the aforementioned configuration is used to cut off power to a powered circuit when the temperature rises. A constant current is supplied from the constant current source. When this current flows into the input of the first current circuit, the first current mainly dependent on the primary temperature coefficient (primary function of the temperature) is output from the first current circuit. The first current is input into the second current circuit, which outputs the second current mainly dependent on the Nth (N: an integer of 2 or larger) temperature coefficient (Nth function of the temperature). In response to the increase in the second current along with the temperature rise, the power control circuit will stop power to the powered circuit. In this way, power to the powered circuit is shut down (thermal shut-down operation).

In addition to the increase of the ambient temperature, temperature rise also occurs when an over-current flows to the fed circuit. In that case, the powered circuit can be protected from excess current by the thermal shut-down operation. Alternatively, the output of the powered circuit will be halted as a result of the power shutdown. When the operation of another circuit group is controlled based on the output of the powered circuit, that circuit group can be protected from excess current by halting the output of the powered circuit.

When the temperature rise is strongly dependent on internal heating, power to the powered circuit will be restarted after the temperature drops due to the power stoppage. Therefore, power to the powered circuit can be stopped and restarted repeatedly and intermittently in a short period of time. In one aspect of the present invention, a start control circuit and a monitoring circuit are used to control the start-up and initialization periods to prevent this phenomenon.

When the power control circuit shuts down the power to the powered circuit, power from the start control circuit to the constant current source, and furthermore to the first and second current circuits will be stopped. As a result, power to the powered circuit will not be stopped and restarted repeatedly and intermittently in a short period of time.

BRIEF DESCRIPTION OF THE DRAWINGS

FIG. 2 is the circuit diagram of the temperature detecting circuit (thermal shut-down circuit) that can generate a secondary current.

FIG. 3 is the circuit diagram illustrating a general square circuit.

FIG. 4 is the circuit diagram illustrating the startup circuit.

REFERENCE NUMERALS AND SYMBOLS AS SHOWN IN THE DRAWINGS

Figure 1:
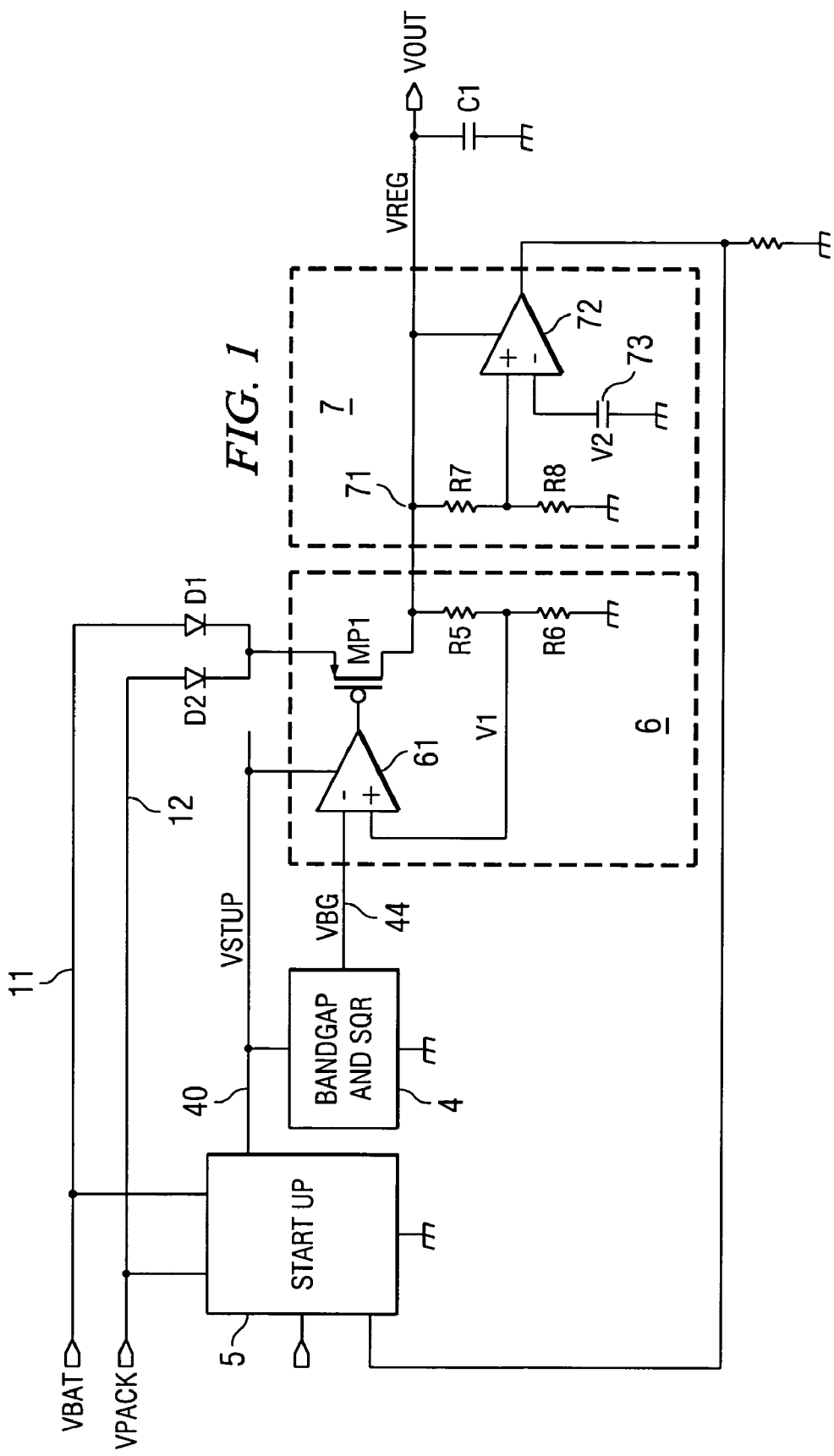
FIG. 1 is a schematic diagram illustrating the configuration of the double power supply driven regulator (voltage generating circuit) disclosed in an embodiment of the present invention.

In the figures, 1 represents a regulator; 4 represents a temperature detecting circuit; 5 represents a startup circuit; 6 represents a regulator unit; 7 represents a monitoring circuit; 41 represents a constant current source; 42 represents a primary current circuit; 43 represents a secondary current circuit; 44 represents a internal supply line; 61 represents a error amplifier; 71 represents a feeding point of the regulator unit; MP1 represents a power control switch; MP2, MN1 represents a shut-down switch; V1 represents a reference voltage for power control; XINIT represents an initialization signal.

DESCRIPTION OF THE EMBODIMENT

By using the thermal shut-down circuit disclosed in the present invention, a current (second current) dependent on a high-order temperature coefficient (high-order function of temperature) of second order or higher will be generated. When this current is used to stop power (thermal shut-down operation), a sharp thermal shut down as a result of a slight temperature rise near the response point becomes possible. This thermal shut-down characteristic can be adjusted easily by properly adjusting the current supplied by the constant current source.

When a band gap circuit is used as the first current circuit and a translinear Nth-order circuit is used as the second current circuit, a second current that is almost independent of the parameters of the circuit constituent elements can be generated so that operation can be performed in a narrow range near a specified temperature. Also, when the band gap circuit is combined with a transistor element, a thermal shut-down circuit, which can perform the shut down operation in a thorough and accurate manner, can be realized with a simple configuration.

When the start-up and initialization function is adopted, the resetting control after the thermal shut down can be conducted based on arbitrarily set start-up information. As a result, it is possible to prevent the power supply voltage from being stopped and re-started repeatedly and intermittently, which will shorten the service life of the device and cause noise as well as waste power. When start-up information is set such that it is possible to detect that the power supply voltage has risen after dropping below an arbitrarily set shut-down voltage and then reaches an arbitrarily set start-up voltage, proper start-up and initialization can be performed corresponding to the removal or insertion of an external power supply and the resetting operation. Also, this case is preferred because the circuit for generating the start-up information can comprise a simple voltage detecting circuit.

If there is difference in the requirements for shutting down power in a double power supply driven system, a shut-down switch can be used at least in the path with a more urgent shut-down need, while the other path is used as the feeding path at the time of start-up. In this way, the configuration of the start-up circuit can be simplified.

In the following, an embodiment of the present invention will be explained with reference figures based on an example of a double power supply driven regulator.

FIG. 1 is a schematic diagram illustrating the configuration of the double power supply driven regulator.

Said regulator 1 is a voltage generating circuit, which is incorporated in a double power supply battery pack, for example, an AC adapter power supply and a battery power supply, and is used to supply a constant voltage to the circuit for displaying the remaining battery power or protection of that battery. As shown in FIG. 1, regulator 1 comprises regulator unit 6 and a thermal shut-down unit, which cuts off power to regulator unit 6 when the temperature rises as a result of excess current flowing in regulator unit 6, etc.

The thermal shut-down unit is dependent on the Nth (N: an integer of 2 or larger) coefficient of temperature, for example, the secondary coefficient of the temperature. It has a circuit (BANDGAP&TL-SQR.) 4 for generating a secondary current proportional to the square of the temperature, a start-up circuit (STARTUP) 5, a power control circuit 6, and a monitoring circuit 7.

FIG. 2 is the circuit diagram of circuit (BANDGAP&TL-SQR.) 4 used for generating a secondary current.

Said circuit 4 comprises constant current source 41 connected between feeding line 40 (voltage: VSTUP) and internal feeding line 44 (voltage: VBG), primary current circuit 42 that receives the current from constant current source 41 as input and is dependent on the primary coefficient of the temperature, that is, outputs primary current IPTAT in proportion to the temperature coefficient, secondary current circuit 43 that receives primary current IPTAT as input and is dependent on the Nth (in this case, N=2) coefficient of the temperature, that is, outputs a secondary current IPTAT2 in proportion to the square of the coefficient of the temperature, and short-circuit transistor Q11 that is tuned to pull the voltage VBG of internal feeding line 44 back to reference potential VSS corresponding to an increase in the secondary current IPTAT2.

Primary current circuit 42 is a so-called band gap (BANDGAP) circuit, which can use the relational expression of the base-emitter voltage Vbe of an NPN bipolar transistor near the band gap of the semiconductor PN junction to generate output proportional to the temperature. This circuit supplies the voltage of IPTAT.R (=R1+R2+R3)+VBE as VBG. Since the base-emitter voltage VBE of the transistor has a temperature coefficient of −2 mV/° C., by adjusting the value of variable resistor R2 in such a way that the resistance R becomes +2 mV/° C., a band gap voltage VBG of about 1.2 V independent of the primary coefficient of the temperature can be output.

Also, the secondary current circuit 43 shown in FIG. 2 has a similar configuration to the band gap circuit. As to be described later, it is a translinear square circuit (TL-SQR.), which uses the so-called translinear principle and has a square transmission characteristic with respect to temperature, independent of the characteristics of the constituent elements of the circuit or the semiconductor manufacturing process. In the following, circuit (BANDGAP&TL-SQR.) 4 shown in FIG. 2 is simply referred to as "temperature detecting circuit."

Primary current circuit 42 has three NPN transistors Q1, Q2, and Q3, three PNP transistors Q4, Q5, Q6, and three resistors R1, R2, and R3. It is a circuit that constitutes four current paths connected in parallel between internal feeding line 44 and the supply line of reference potential VSS, that is, the series circuit of the three resistors R1-R3 and transistor Q1, the series circuit of transistors Q4 and Q2, the series circuit of transistors Q5 and Q3, and the series circuit of transistor Q6 and the input stage of the trans-linear square circuit. The current path to which transistor Q1 is connected constitutes the input stage of primary current circuit 42, while the current path to which transistor Q6 is connected constitutes the output stage.

The bases of transistors Q1 and Q3 are connected to each other. Their common node is connected to the node between resistors R2 and R3. The base of transistor Q2 is connected to the collector of transistor Q1. Also, the bases of transistors Q4, Q5, and Q6 are connected to each other. Their common node is connected to the collector of transistor Q4. Transistors Q1 and Q3 have the same size and are arranged close to each other. Transistors Q4-Q6 have the same size and are arranged close to each other. Consequently, the mirror current of current IQ flowing through transistor Q1 of the input stage flows to transistors Q3 and Q5. Also, the mirror current of the current flowing through transistors Q3 and Q5 flows to transistors Q2 and Q4 as well as transistor Q6. As a result, if the input current IQ is determined, the output current IPTAT, which is almost equal to the input current, is also determined. The output current is input into the secondary current circuit (TL-SQR.) in the next stage.

Also, the size of transistor Q2 is M times (such as 8 times) larger than the size of transistors Q1, Q3. Resistors R1 and R3 are set to the order of tens of k$\chi$, while resistor R2 is set to the order of several hundred k$\chi$-several M$\chi$. Said resistor R2 can also be a fixed resistor. If the resistance of resistor R3 is taken as r3 and the base-emitter voltages of transistors Q2, Q3 are taken as VBEQ2, VBEQ3, the following relational expression is valid.

$$VBEQ2+IQ.r3=VBEQ3$$

Since VBEQ2=VT.In{IQ/(M.Is)}, VBEQ3=VT.In(IQ/Is) (Is: saturation current), the following can be obtained.

$$IQ \cdot r3 = VT \cdot \ln(IQ/Is) - VT \cdot \ln\{IQ/(M \cdot Is)\}$$
$$= VT(\ln IQ - \ln Is - \ln IQ + \ln M + \ln Is)$$
$$= VT \cdot \ln M$$

Consequently, current IQ becomes the following:

$$IQ=VT.\{(lnM)/r3\} \quad (VT=k.T/q)$$

In this case, M is the size ratio of transistor Q2 to transistor Q3, VT is the so-called thermal voltage, k is Boltzmann's constant, T is the absolute temperature, and q is the quantity of electric charges.

Although resistance r3 has a temperature characteristic, it is so insignificant that it can be ignored for thermal voltage VT. Consequently, as can be seen from the equation of IQ listed above, the input current of primary current circuit 42 is proportional to absolute temperature T. This current is directly output as primary current IPTAT. The primary current IPTAT becomes a linear output that is proportional to the primary coefficient (primary function) of absolute temperature T. Also, the primary coefficient value can be changed by varying the specified transistor size ratio M or resistance r3.

Strictly speaking, current IPTAT is also affected by the high-order coefficients of the temperature. However, since that influence can be ignored, the primary coefficient of the temperature becomes dominant for the current IPTAT.

FIG. 3 shows the general circuit (translinear square circuit: TL-SQR.) of secondary current circuit 43. In order to clarify the corresponding relationship, the symbols of the corresponding transistors shown in FIG. 3 are shared with those in FIG. 2.

The translinear square circuit (TL-SQR.) shown in FIG. 3 comprised 4 NPN transistors Q7, Q8, Q9, and Q10 and one constant current source 45.

Transistors Q7 and Q8 are connected in series. Their collector and base are connected to each other. Also, the bases of transistors Q7 and Q9 are connected to each other. Constant current source 45 is connected between the emitter of transistor Q9 and the supply line of reference potential VSS. The collector of transistor Q9 is connected to the supply line of power supply voltage VCC. The node between the emitter and constant current source 45 is connected to the base of transistor Q10. Also, the emitters of transistors Q10 and Q8 are both connected to the supply line of reference potential VSS. The translinear square circuit with the aforementioned configuration receives the current from the collector of transistor Q7 as input and outputs a current dependent on the secondary coefficient of the temperature to transistor Q10.

When the base-emitter voltages of transistors Q7, Q8, Q9, Q10 are taken as VBEQ7, VBEQ8, VBEQ9, VBEQ10, respectively, the equation of (VBEQ7+VBEQ8=VBEQ9+VBEQ10) becomes valid. When the input current, the output current, and the current flowing through constant current source 45 are taken as Iin, Iout, and I, respectively, and when transistors Q7, Q8, Q9, Q10 have the same magnitude, the following relational expression becomes valid.

$$VBEQ10 = VBEQ7 + VBEQ8 - VBEQ9$$
$$VT \cdot \ln(Iout/Is) = VT \cdot \ln(Iin/Is) + VT \cdot \ln(Iin/Is) - VT \cdot \ln(I/Is)$$
$$\ln(Iout) = \ln\{Iin) + \ln(Iin) - \ln(1)$$
$$Iout = (Iin)^2 / 1$$

In this case, when Iin=IPTAT(IQ), the following equation can be obtained.

$$Iout = \{(VT \cdot lnM)/r3\}^2/I \quad (VT=k.T/q)$$

When the characteristic of current I flowing through constant current source 45 with respect to temperature is set to be essentially flat, output current Iout becomes proportional to the square of absolute temperature T. That is, output current Iout becomes dependent on the secondary coefficient of absolute temperature T. Consequently, the circuit show in FIG. 3 is called a translinear square circuit that outputs current Iout in proportion to the square of absolute temperature T.

In FIG. 2, the input current of translinear square circuit (secondary current circuit) 43 is primary current IPTAT coming from primary current circuit 42. The internal power supply voltage VBG is used as the power supply voltage VCC in FIG. 3. Also, resistor R4 is used instead of constant current source 54. When the resistance of resistor R4 is taken as r4, current I in FIG. 3 can be expressed as VBEQ10/r4. Although VBEQ10/r4 has a temperature characteristic, since the primary temperature coefficient is small compared with the secondary temperature coefficient, output current IPTAT2 is dominated by the square of absolute temperature T. In the circuit shown in FIG. 2, in order to simplify the circuit configuration, resistor R4 is used instead of constant current source 45 shown in FIG. 3. However, it is also possible to use constant current source 45.

The base potential of transistor Q10 drives the base of the transistor Q11 connected between the supply line 44 of reference voltage VBG and the supply line of reference potential VSS. Consequently, the current flowing through transistor Q11 is the same as current IPTAT2 flowing through transistor Q10. As a result, in the circuit shown in FIG. 2, the input current IQ and the output current (primary current) IPTAT of the primary current circuit are the same current that is proportional to temperature. The current IPTAT2 obtained based on the primary current is proportional to the square of the temperature. The current in proportion to the square of the temperature flows to transistor Q11. Usually, the current flowing through transistor Q11 at-room temperature is smaller than constant current Iref flowing through constant current source 41 at room temperature. When the temperature rises, IPTAT2 increases sharply in the pattern of a square curve. At some operating temperature, the current flowing through transistor Q11 becomes larger than constant current Iref. As a result, the voltage of internal supply line 44 drops sharply from VBG during the normal operation to reference potential VSS. The operating temperature can be set in the range of 130-180° C.

The internal supply line 44 that also acts as the output line of the temperature detecting circuit 4, which is constituted and operates as described above, is connected to the regulator unit 6 in the next stage.

As shown in FIG. 1, regulator 6 has error amplifier 61, PMOS transistor MP1 used as "power control switch," and two resistors R5 and R6 used for generating reference voltage V1 for power control.

Two types of power supply voltages with respect to the source of PMOS transistor MP1 that constitutes the power control switch, that is, power supply voltage (battery power supply voltage) VBAT from the internal battery and pack power supply voltage VPACK as the power supply voltage from the AC adapter in the electric device, which contains the battery, are connected as inputs via either of two power diodes D1 and D2 that are connected in a diode OR circuit arrangement. The anode of diode D1 is connected to feeding line 11 of battery power supply voltage VBAT. Its cathode is connected to the source of PMOS transistor MP1. Also, the anode of diode D2 is connected to feeding line 12 of pack power supply voltage VPACK, and its cathode is connected to the source of PMOS transistor MP1.

On the other hand, resistors R5 and R6 are connected between the drain of PMOS transistor MP1 and the reference potential, such as the ground potential.

Also, a capacitor C1 for maintaining the voltage is connected to the drain of PMOS transistor MP1. In the circuit configuration shown in FIG. 1, the circuit elements other than capacitor C1 can be formed into one semiconductor integrated circuit (semiconductor chip).

The inverting input "−" of error amplifier 61 is connected to internal feeding line 44, while its non-inverting input "+" is connected to the node between resistors R5 and R6. Also, error amplifier 61 operates under the power supplied from feeding line 40 of power supply voltage VSTUP. Error amplifier 61 controls the gate voltage of PMOS transistor MP1 in such a way that voltage V1 at the node between resistors R5 and R6 is equal to reference voltage VBG. For example, reference voltage VBG is about 1.2 V, and the output voltage of PMOS transistor MP1 is about 3.3 V.

As described above, the voltage of internal supply line 44 is maintained at internal power supply voltage VBG in the normal state. When the temperature reaches a prescribed level, it is pulled back to reference potential VSS. When the voltage of internal supply line 44 is pulled back to reference potential VSS and becomes lower than reference voltage VBG, the output of error amplifier 61 becomes high level, which can turn off transistor MP1, and PMOS transistor MP1 is turned off. The voltage output from regulator unit 6 is stopped.

Monitoring circuit 7 has resistors R7 and R8, comparator 72, and constant current source 73. Resistors R7 and R8 are connected in series between regulator feeding line 71 and the supply line of reference potential VSS. Their common node point is connected to the non-inverting input "+" of comparator 72. Constant current source 73, such as a band gap constant voltage circuit that can generate reference voltage V2 independent of temperature, is connected between the inverting input "−" of comparator 72 and the supply line of reference potential VSS. Said reference voltage V2 independent of temperature is known as "shut-down voltage" or "startup voltage". It specifies the stop (shut down of the feeding path) and startup conditions for temperature detecting circuit 4. Comparator 72 outputs an output signal XINIT of low level to startup circuit 5 when the voltage supply from regulator unit 6 is stopped and the voltage of regulator feeding line 71, furthermore, the voltage at the node between resistors R7 and R8 becomes lower than reference voltage V2. When the output signal XINIT of comparator 72 changes from high level to low level, it functions as a "shut-down signal." In response to this level change, the voltage supply from startup circuit 5 to the feeding line 40 of temperature detecting circuit 4 is stopped. On the other hand, when output signal XINIT changes from low level to high level, it acts as an "initialization signal" to initialize startup circuit 5.

FIG. 4 shows the configuration of startup circuit 5.

Startup circuit 5 has PMOS transistor MP2 and NMOS transistor MN1 that function as "shut-down switches," power diodes D3 and D4 for preventing reverse flow, Zener diodes ZD1 and ZD2 for level shifting, resistors R9 and R10, and NMOS transistors MN3 and MN4 for control shut down and initialization.

Shut-down switch MP2 is connected to the supply line of battery power supply voltage VBAT via diode D3. Shut-down switch MN1 is connected to the supply line of pack power supply voltage VPACK via diode D4. The drain and gate of shut-down switch MN1 and the drain of shut-down switch MP2 are connected to each other by short-circuit line 51. Zener diode ZD1 is connected between the gate of shut-down switch MN1 and reference potential VSS. Power supply voltage VSTUP supplied to temperature detecting circuit 4 (FIG. 1) is output from the source of shut-down switch MN1.

Zener diode ZD2 and resistor R9 are connected in parallel to each other between the gate of shut-down switch MP2 on the battery side and the cathode of diode D3. Also, resistor R10 and NMOS transistors MN3, MN4 are connected in series between the gate of shut-down switch MP2 and the supply line of reference potential VSS.

A gate bias circuit, which controls the shut-down and initialization of shut-down switch MP2 on the battery side, is constituted by the aforementioned Zener diodes ZD, resistors R9, and NMOS transistors MN3 and MN4. The aforementioned initialization signal XINIT is input to the gate of NMOS transistor MN4. A control signal XSHUT, which inhibits shut-down or initialization for a low level but allows shut-down or initialization for a high level, is input, for example, from the microcomputer in the battery system to the gate of NMOS transistor MN3.

In the following, the operation of the circuits shown in FIGS. 1 and 4 will be explained.

In the initial state, since neither battery power supply voltage VBAT nor pack power supply voltage VPACK is applied, neither circuit is operable. At this time, since control signal XINIT is at a low level, transistor MN4 is off. Consequently, even if battery power supply voltage is supplied first, shut-down switch MP2 is kept in the off state due to the gate bias setting realized by diode D1 and Zener diode ZD2. On the other hand, when pack power supply voltage VPACK is supplied, the gate of shut-down switch MN1 goes to high level via diode D4 and short-circuit line 51, and shut-down switch MN1 is turned on. Voltage VSTUP obtained by lowering the level from pack power supply voltage VPACK is supplied to temperature detecting circuit 4.

After receiving voltage VSTUP, temperature detecting circuit 4 generates secondary current IPTAT2 in proportion to the secondary temperature coefficient as a result of the operation described above. However, during the period when the temperature does not reach the threshold value for abnormal temperatures, current IQ11 flowing through transistor Q11 is smaller than the constant current ref of constant current source 41. Therefore, the voltage VBG of the internal supply line retains the prescribed level, and the output of error amplifier 61 is not at a high level that will turn off PMOS transistor MP1, so that a voltage is supplied from power control switch MP1. As a result, a prescribed regulator voltage VREG (for example, 3.3 V) lower than pack power supply voltage VPACK is generated by regulator unit 6 and the regulator output is output as output voltage Vout.

At this time, monitoring circuit 7 monitors the voltage of regulator feeding line 71 connected to the drain of feed control switch MP1. When the voltage of regulator feeding line 71 becomes higher than reference voltage V2 during the process of supplying pack power supply voltage VPACK, the output signal XINIT of comparator 72 goes from low level to high level. Therefore, transistor MN4 shown in FIG. 4 is turned on, and the gate voltage of shut-down transistor MP2 is decreased, and the transistor is turned on. As a result, a power supply path from the battery is formed and initialized. On the other hand, power from pack power supply voltage VPACK to temperature detecting circuit 4 is continued as long as pack power supply voltage VPACK does not drop below a prescribed voltage, such as 4.5 V.

Then, when the battery is fully charged and the power supply switches from pack power supply voltage VPACK to battery power supply voltage VBAT, voltage VSTUP lower than battery power supply voltage VBAT is sent to temperature detecting circuit 4 via shut-down switches MP2 and MN1 in the on state.

After receiving said voltage VSTUP, temperature detecting circuit 4 generates secondary current IPTAT2 in the same way as described above. However, during the period when the temperature is normal, current IQ11 flowing through transistor Q11 is smaller than constant current Iref, and reference voltage VBG is supplied to error amplifier 61. As a result, regulator unit 6 outputs a regulator voltage VREG (for example, 3.3 V) obtained by controlling battery power supply voltage VBAT as output voltage Vout.

When the temperature of the battery rises sharply due to abnormal discharge, secondary current IPTAT2 increases sharply due to this temperature change. The current IQ11 flowing through transistor Q11 becomes larger than constant current Iref, and the voltage on supply line 44 becomes lower than the reference voltage. When that happens, the voltage level at the inverting input "−" of error amplifier 61 becomes much lower than voltage V1. As a result, its output becomes high level, which turns off power control transistor MP1.

After that, the voltage of regulator feeding line 71 drops from 3.3 V. When it becomes lower than reference voltage V2, such as 2.4 V, transistor MN4 shown in FIG. 4 is turned off. As a result, the gate of shut-down switch MP2 is pulled up by battery power supply voltage VBAT, and shut-down switch MP2 is turned off. In this way, the feeding path of battery power supply voltage VBAT is shut down, and the operation of temperature detecting circuit 4 stops.

Since the power supply switches to pack power supply voltage VPACK when charging of the battery is started again, voltage VSTUP is supplied to temperature detecting circuit 4 again, and feed control transistor MP1 operates so that the voltage of regulator feeding line 71 starts to rise. When the voltage reaches reference voltage V2, the output signal of comparator 72 becomes high level again to turn on transistor MN4. Shut-down transistor MP2 is turned on and initialized to prepare for the state that enables power supply at any time even if there a switch in battery polarity.

As described above, in this embodiment, when an abnormal temperature rise occurs, secondary current IPTAT2 increases in the form of a secondary curve. In response to this increase, the current flowing through transistor Q11 becomes larger than constant current Iref, and the voltage of internal supply line 44 becomes lower than reference voltage VBG and reaches reference potential VSS. Since the time it takes the voltage of internal supply line 44 to drop can be adjusted by changing the value of constant current Iref, the time until shut down occurs can be adjusted properly. By using this shut-down function, the output of, for example, a reset circuit can be thermally shut down. As the value of constant current Iref supplied by constant current source 41 is reduced, it becomes possible to conduct a sharp shut-down operation.

Figure 5:
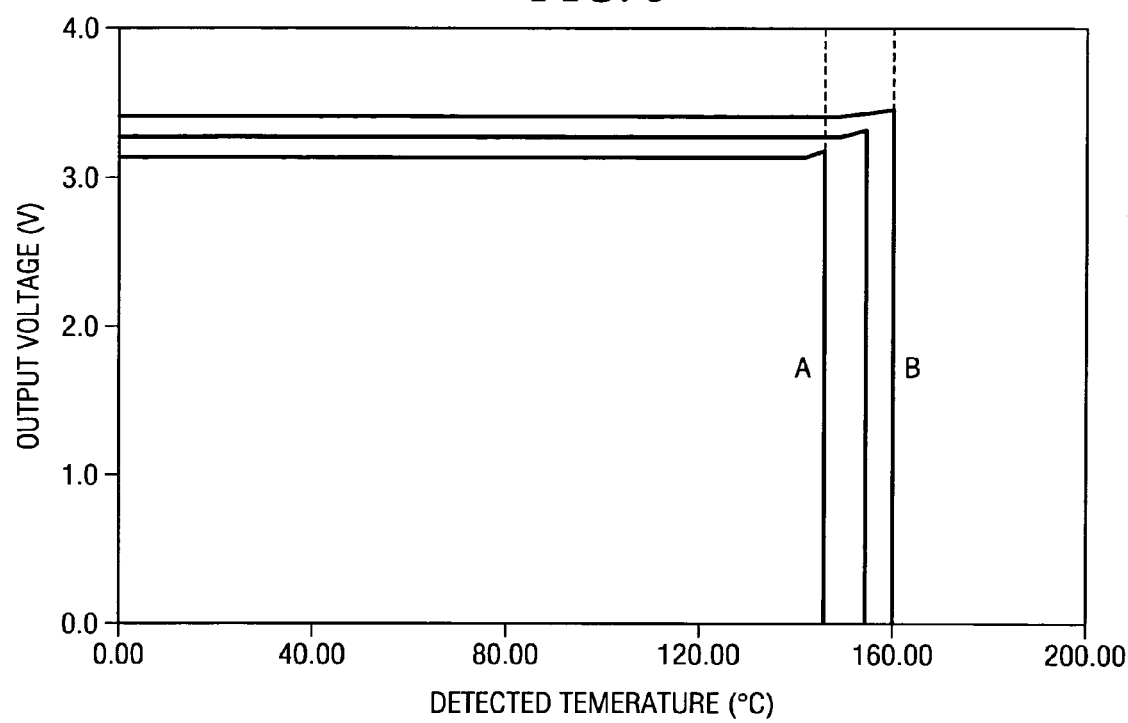
FIG. 5 is a diagram illustrating the response characteristic of the output (potential of the feeding line) with respect to the detected temperature.

FIG. 5 shows the response characteristic of the output (potential of the feeding line) with respect to the detected temperature. As can be seen from the result of the simulation conducted by setting the detected temperature at 150° C., a difference of about 16° C. was observed between strong detection sensitivity (A) and the poor detection sensitivity (B). A sharp characteristic with respect to temperature was also observed. In the present invention, since secondary current IPTAT2 is not significantly affected by the parameters of the constituent elements or the manufacturing process, highly accurate results can be obtained. Also, the temperature detection range can be narrowed, and sharp and sensitive temperature detection becomes possible.

When the voltage of regulator feeding line 71 is monitored to conduct the shut-down operation, once the voltage drops below reference value V2, transistor MN4 in startup circuit 5 is turned off, shut-down switch MP2 is turned off, and feeding to temperature detecting circuit 4 is stopped. Consequently, even if the temperature drops, as long as power supply voltage VPACK is not supplied again, power control transistor MP1 is kept in the off state. As a result, the repeated and intermittent on and off switching of the power supply based on the temperature detecting point can be prevented. Also, wasted power consumption of the battery can be held to a minimum.

When pack power supply voltage VPACK is supplied later, the voltage of regulator feeding line 71 increases again. When it reaches reference voltage V2, transistor MN4 in startup circuit 5 is turned on, and shut-down switch MP2 is turned on and initialized. At this time, the system is prepared for switching to battery power at any time. Since the startup information controlling this sequence can be realized by monitoring circuit 7 that monitors the voltage, the circuit configuration can be simplified. In particular, using analog Bi CMOS processing, it is possible to adopt a circuit configuration that is commonly used, so the degree of circuit variation is low.

Figure 6:
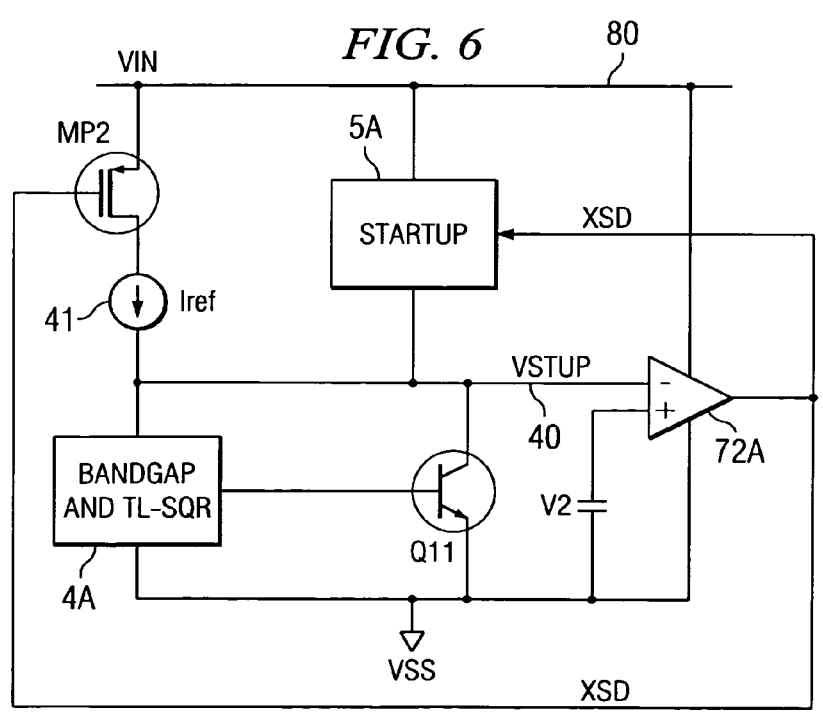
FIG. 6 is a diagram illustrating a connection example of the thermal shut-down circuit for the case of single power supply.

FIG. 6 shows the configuration for the case of single power supply.

In the aforementioned configuration shown in FIG. 1, shut-down switch MP2 is set in startup circuit 5A. In the configuration shown in FIG. 6, however, shut-down switch MP2 is set outside startup circuit 5. Also, the temperature detecting circuit 4A shown in FIG. 6 only comprises primary and secondary current circuits 42 and 43 by excluding constant current source 41 and transistor Q11 from the configuration shown in FIG. 2. Shut-down switch MP2 is connected between the supply line 80 of power supply voltage VIN and constant current source 41. In this case, startup circuit 5A is connected between the supply line 80 of power supply voltage VIN and the supply line 40 of voltage VSTUP and can function temporarily as a supply bypass for power supply voltage VIN in order to perform startup when shut-down switch MP2 is turned off. As a result, when temperature detecting circuit 4A detects an abnormal temperature and the current IQ11 flowing through transistor Q11 becomes larger than secondary current IPTAT2 as a result of the increase in the secondary current IPTAT2, the voltage of supply line 40 is lowered. When voltage VSTUP is connected to reference potential VSS, the output signal XSD of comparator 72A goes from low level to high level to turn off the shut-down switch, and the feeding path on the side of constant current source 41 is shut down. On the other hand, when a power supply voltage is applied next, it is detected by startup circuit 5A, which temporarily opens the supply bypass for power supply voltage VIN. Voltage VSTUP increases, and the output signal XSD of the comparator goes from high level to low level. As a result, shut-down switch MP2 is turned on and initialized.

Figure 7:
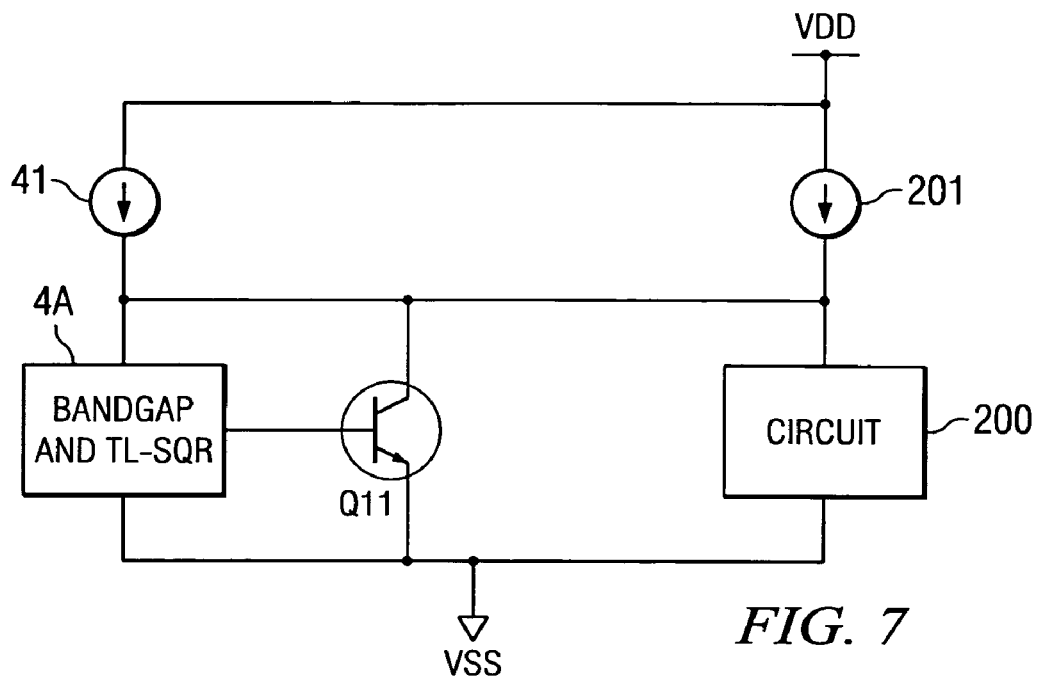
FIG. 7 is a diagram illustrating a connection example of the thermal shut-down circuit in the case when startup is unnecessary.
Figure 8:
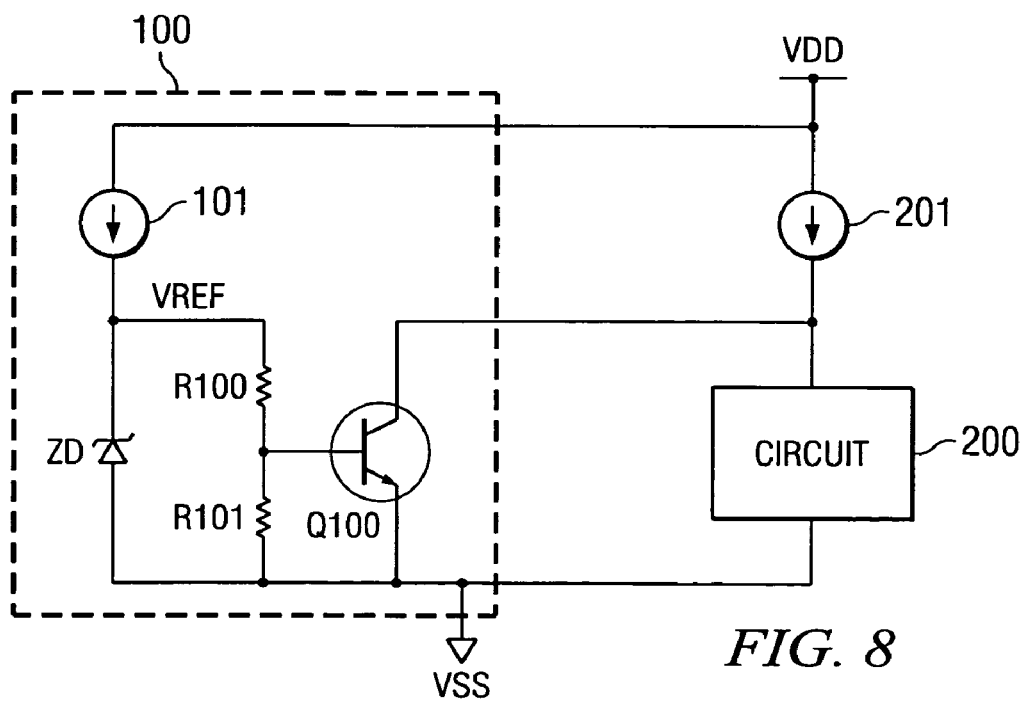
FIG. 8 is a diagram illustrating a typical configuration of the conventional thermal shut-down circuit.

FIG. 7 shows the configuration in the case when startup becomes unnecessary.

For example, when an extremely abnormal temperature rise is detected, a final fail-safe test is performed to completely cut off power to circuit 200, which will not operate later. In that case, since startup becomes unnecessary, by only adopting temperature detecting circuit 4A comprising the primary and secondary current circuits, constant current source 41, and transistor Q11, the operation can be stopped by connecting the power point of circuit 200 to reference potential VSS.

In the configurations shown in FIGS. 7 and 5, secondary current IPTAT2 in proportion to the secondary temperature coefficient is used, and transistor Q11 is used to control feeding by the optimum shut-down operation. This is an advantage.

In the circuit shown in FIG. 2, the base of transistor Q1 is connected together with the base of transistor Q3 to the node between resistors R2 and R3. It, however, can also be connected together with the base of transistor Q2 to the collector of transistor Q1. Like transistor Q2, the size of transistor Q1 can also be M times of that of transistor Q3. The same current as that obtained from the circuit shown in FIG. 2 can be obtained using this configuration.

It is also possible to use $3^{rd}$ order, $4^{th}$ order, or other high-order circuits and to use a current in proportion to the Nth [coefficient] of absolute temperature T to perform the shut-down operation.

In addition, the set temperature of the thermal shut-down operation can be set to any temperature corresponding to the circuit in application.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. Thermal shut-down circuit used for shutting down power to a powered circuit when the temperature rises, comprising:
   a first current circuit, which generates a first current mainly dependent on a primary coefficient of temperature;
   a second current circuit, which receives the first current as an input and outputs a second current mainly dependent on the Nth (N: an integer of 2 or larger) order coefficient of temperature;
   a constant current source that supplies current to the first and second current circuits; and
   a power control circuit, responsive to an increase in the second current for shutting down power to the powered circuit.

2. The thermal shut-down circuit described in claim 1, wherein power control circuit is connected to a node between the constant current source and the first current circuit as well as the second current circuit, and power is supplied to the powered circuit from this node.

3. The thermal shut-down circuit described in claim 2, wherein the first current circuit has a band gap circuit for supplying a band gap voltage to the node;

the power control circuit comprises a transistor element; when the transistor element introduces a current larger than the current supplied by the constant current source from the node, the voltage at the node drops, and power to the powered circuit is cut off.

4. The thermal shut-down circuit described in claim 3, wherein the second current circuit has a translinear circuit that supplies the second current independent of variation in parameters of the circuit elements that constitute the second current circuit.

5. The thermal shut-down circuit described in claim 3 the first current circuit has a first current mirror circuit for supplying a first mirror current and a second current mirror circuit for supplying a second mirror current corresponding to the first mirror current;

a control terminal of the transistor element being connected to a control terminal of a transistor in the second current circuit that supplies the second current.

6. The thermal shut-down circuit described in claim 1 wherein a regulator circuit used as the powered circuit receiving the voltage supplied from the node, and supply of the regulated voltage from this regulator circuit is controlled by the power control circuit.

7. The thermal shut-down circuit described in claim 6 comprising a monitoring circuit, which is coupled to the output of the regulator circuit to monitor the regulator voltage, and a start control circuit, which cuts off power to the constant current source when the regulator voltage is not at a prescribed level.

8. The thermal shut-down circuit described in claim 7, wherein the start control circuit has a first power supply terminal and a first switch element inserted into the feed path between the first power supply terminal and the constant current source; and power to the constant current source is stopped by shutting down the first switch element.

9. The thermal shut-down circuit described in claim 8, wherein the start control circuit has a second power supply terminal and a second switch element inserted into the feed path between the first switch element and the constant current source; when a voltage is supplied to the second power supply terminal, the second switch element becomes conductive to power the constant current source.

10. The thermal shut-down circuit described in claim 4 the first current circuit has a first current mirror circuit for supplying a first mirror current and a second current mirror circuit for supplying a second mirror current corresponding to the first mirror current;

a control terminal of the transistor element being connected to a control terminal of a transistor in the second current circuit that supplies the second current.

11. The thermal shut-down circuit described in claim 3 wherein a regulator circuit used as the powered circuit receiving the voltage supplied from the node, and supply of the regulated voltage from this regulator circuit is controlled by the power control circuit.

12. The thermal shut-down circuit described in claim 4 wherein a regulator circuit used as the powered circuit receiving the voltage supplied from the node, and supply of the regulated voltage from this regulator circuit is controlled by the power control circuit.

13. The thermal shut-down circuit described in claim 5 wherein a regulator circuit used as the powered circuit receiving the voltage supplied from the node, and supply of the regulated voltage from this regulator circuit is controlled by the power control circuit.

* * * * *